United States Patent
Mu et al.

(10) Patent No.: US 8,055,613 B1
(45) Date of Patent: Nov. 8, 2011

(54) METHOD AND APPARATUS FOR EFFICIENTLY DETECTING AND LOGGING FILE SYSTEM CHANGES

(75) Inventors: Paul Yuedong Mu, San Jose, CA (US); Sajeev Aravindan, Bangalore (IN); Chandrasekar Srinivasan, Bagalore (IN)

(73) Assignee: Netapp, Inc., Sunnyvale, CA (US)

( * ) Notice: Subject to any disclaimer, the term of this patent is extended or adjusted under 35 U.S.C. 154(b) by 768 days.

(21) Appl. No.: 12/111,756

(22) Filed: Apr. 29, 2008

(51) Int. Cl.
*G06F 17/30* (2006.01)

(52) U.S. Cl. ........ 707/610; 707/615; 707/616; 707/624; 707/637; 707/639; 707/640; 707/646; 707/647; 707/648; 707/649; 707/651; 707/682; 707/685

(58) Field of Classification Search ............... 707/610, 707/615, 616, 624, 637, 639, 640, 646, 647, 707/648, 649, 651, 682, 685
See application file for complete search history.

(56) References Cited

U.S. PATENT DOCUMENTS

| | | | | |
|---|---|---|---|---|
| 4,945,475 | A * | 7/1990 | Bruffey et al. ................ | 1/1 |
| 7,082,438 | B2 * | 7/2006 | Najork et al. ................ | 1/1 |
| 7,155,465 | B2 * | 12/2006 | Lee et al. ..................... | 1/1 |
| 7,162,599 | B2 * | 1/2007 | Berkowitz et al. ........... | 711/162 |
| 7,366,859 | B2 * | 4/2008 | Per et al. ..................... | 711/162 |
| 7,565,661 | B2 * | 7/2009 | Sim-Tang ..................... | 719/318 |
| 7,694,086 | B1 * | 4/2010 | Bezbaruah et al. ........... | 711/162 |
| 7,809,868 | B1 * | 10/2010 | Mu ............................... | 710/74 |
| 7,814,057 | B2 * | 10/2010 | Kathuria et al. .............. | 707/646 |
| 2004/0064488 | A1 * | 4/2004 | Sinha .......................... | 707/204 |
| 2004/0153479 | A1 * | 8/2004 | Mikesell et al. ............. | 707/200 |
| 2005/0223043 | A1 * | 10/2005 | Randal et al. ................ | 707/200 |
| 2005/0251540 | A1 * | 11/2005 | Sim-Tang ..................... | 707/202 |
| 2005/0262097 | A1 * | 11/2005 | Sim-Tang et al. ............. | 707/10 |
| 2005/0262377 | A1 * | 11/2005 | Sim-Tang ..................... | 714/1 |
| 2006/0026188 | A1 * | 2/2006 | Najork et al. ................ | 707/101 |
| 2006/0053139 | A1 * | 3/2006 | Marzinski et al. ............ | 707/101 |
| 2006/0106891 | A1 * | 5/2006 | Mahar et al. ................. | 707/203 |
| 2006/0123250 | A1 * | 6/2006 | Maheshwari et al. ........ | 713/193 |
| 2006/0179086 | A1 * | 8/2006 | Najork et al. ................ | 707/204 |
| 2007/0083722 | A1 * | 4/2007 | Per et al. ..................... | 711/162 |
| 2007/0150499 | A1 * | 6/2007 | D'Souza et al. .............. | 707/101 |
| 2007/0180313 | A1 * | 8/2007 | Stokes et al. ................. | 714/13 |
| 2007/0185939 | A1 * | 8/2007 | Prahland et al. ............. | 707/204 |
| 2008/0256138 | A1 * | 10/2008 | Sim-Tang ..................... | 707/202 |
| 2010/0031274 | A1 * | 2/2010 | Sim-Tang ..................... | 719/318 |

* cited by examiner

*Primary Examiner* — Thanh-Ha Dang
(74) *Attorney, Agent, or Firm* — Perkins Coie LLP

(57) ABSTRACT

A method and apparatus for efficiently logging changes to a file system are disclosed. A file system filter driver intercepts I/O requests directed to a file system, and analyzes the I/O requests to determine whether the requests are write or modify requests directed to a file included in a list of files to be monitored for changes. If the I/O request is directed to such a file, the file system filter driver logs the I/O request to a b-tree structured change log file. Furthermore, in one embodiment, the file system filter driver is configured to log file system changes to multiple log files to coincide with snapshot operations, such that the file system changes to be included in each snapshot are included in separate log files.

17 Claims, 7 Drawing Sheets

METHOD AND APPARATUS FOR EFFICIENTLY DETECTING AND LOGGING FILE SYSTEM CHANGES

FIELD OF THE INVENTION

The invention generally relates to data storage and backup systems. More specifically, the invention relates to a method and apparatus for efficiently, and in real-time, detecting changes to user-selected file system data, and logging the changes to a non-sequential log file.

BACKGROUND

Despite the overall improvement in the reliability of data storage devices (e.g., disk drives), storage devices fail and it remains necessary to implement backup systems to protect against data loss. In a typical backup system, a backup agent executing on a primary computer system identifies data to be backed up, and then communicates a copy of the identified data to a secondary computer system where it is stored. Accordingly, if data loss occurs as a result of a failed data storage device at the primary system, the data can be restored by copying data from the secondary system back to a new data storage device at the primary system.

One of the first requirements in a process for backing up data is to identify the data to be backed up. One way of identifying data to be backed up is to simply analyze a list of directories and/or files from one or more volumes selected by a user (e.g., target data). For example, utilizing this method, a backup agent executing at the primary computer system may periodically copy certain target files and/or directories from one or more volumes of the primary system to the secondary system. This method is inefficient because it does not take into consideration whether a target file or directory has changed since the last backup operation was performed. For instance, a target file may be copied from the primary computer system to the secondary computer system each time a backup operation is initiated, even if the target file has not changed in the time period between backup operations. As a result, the secondary system may store multiple copies of the same file, thereby wasting valuable storage space.

To avoid this inefficiency, many backup systems utilize some form of an incremental backup procedure. With an incremental backup procedure, an initial backup operation is performed to copy all user-selected directories and/or files, from one or more volumes, from a primary computer system to a secondary computer system. This initial backup is sometimes referred to as a baseline backup. After the baseline backup operation, a periodic incremental backup operation is performed to copy only those directories and/or files included in the user-selected set of directories and/or files that have changed since the baseline backup operation, or a subsequent incremental backup operation, was performed. Incremental backup operations may be file-based, in which case the entire file that has changed is included in the incremental backup, or block-based, in which case only the individual blocks (of the file) that have changed are included in the incremental backup. Because many files will only have minor changes from one backup operation to the next, in terms of conserving storage at the secondary computer system a block-level incremental backup scheme is generally more efficient than a file-based backup scheme.

With a block-level incremental backup scheme, there are several methods of identifying the particular blocks that have changed since the last backup operation and are therefore to be included in the current incremental backup. One way to identify the changed blocks is to perform a checksum operation on the individual data blocks. For example, the number of set bits in a particular data block may be calculated and compared to the number of set bits in that block from a previous checksum operation. A checksum value that changes over a period of time for a particular data block indicates the data block has changed. The problem with this approach is that it does not scale very well to work with large sets of data. The process of performing the checksum operation is processor intensive as it must be performed on all data blocks in the monitored set of directories and files—including those data blocks that have not changed. For instance, the processing time required to identify the changed data blocks is a function of the number of directories and files to be backed up, and the overall size of the changed files, without regard for how small a change is made to any particular file. Consequently, from the time a backup operation is initially requested, there may be a significant and undesirable processing delay as the backup agent attempts to identify the data blocks that have changed since the most recently completed backup operation.

Another way to identify the changed blocks is to analyze an attribute associated with each block. For instance, each block may have associated with it a modification time indicating the time at which the block was last modified, or an archive or backup bit, indicating when set (or cleared) that the block is to be included in the next backup operation. This requires that the operation for writing data to the data block also include logic for setting the appropriate attribute (e.g., the archive or backup bit). For many of the same reasons that the checksum operation is problematic, this approach also has drawbacks. Like the checksum method, this approach may also cause a significant delay between the time that a backup operation is requested, and the time that the data to be included in the backup are identified. The attribute that indicates whether a particular block is to be included in a backup must be read for each block in the monitored data set, regardless of whether the block is to be included in the backup. Accordingly, like the checksum method, this approach does not scale well to work with large data sets.

Yet another method for identifying changed data blocks involves logging the changes made as they occur. For instance, a logging process may generate a sequential change log indicating all the blocks in a monitored set of data that have changed. As a result, a long list of block information may be included in the change log. Here again, processing the change log may cause a significant delay from the time a backup operation is initially requested, particularly when a single sequential log is used for a large set of data. A sequential log file often results in duplicate log entries for the same block of data. For instance, a particular data block of a file may be changed several times between two backup operations, and only the last change made to the block is required to be included in the backup. In the log file, the block change information for two separate changes may be separated by several other log entries. Consequently, to determine the actual data for a particular block that has been changed multiple times, the entire log must be processed. Therefore, a more efficient mechanism for identifying data to be included in a backup is desirable.

SUMMARY

The present invention provides a method and apparatus for efficiently identifying and logging block-level changes made to a file system. As client applications write data to files of a file system, a file system logging process monitors this activity and collects information relating to the particular data blocks of the files that are being changed. This information (referred to herein as block change information) is then written to a log file. The log file is structured, and the information is written, such that all block change information associated with a particular file or directory are grouped in a single record identified by the particular file or directory to which the changes relate. Consequently, a backup agent or application that is attempting to identify the particular data blocks for an individual file that have changed can do so by simply reading the record in the log file associated with that individual file.

Other aspects of the invention will become apparent from the description that follows.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DESCRIPTION

Figure 1:
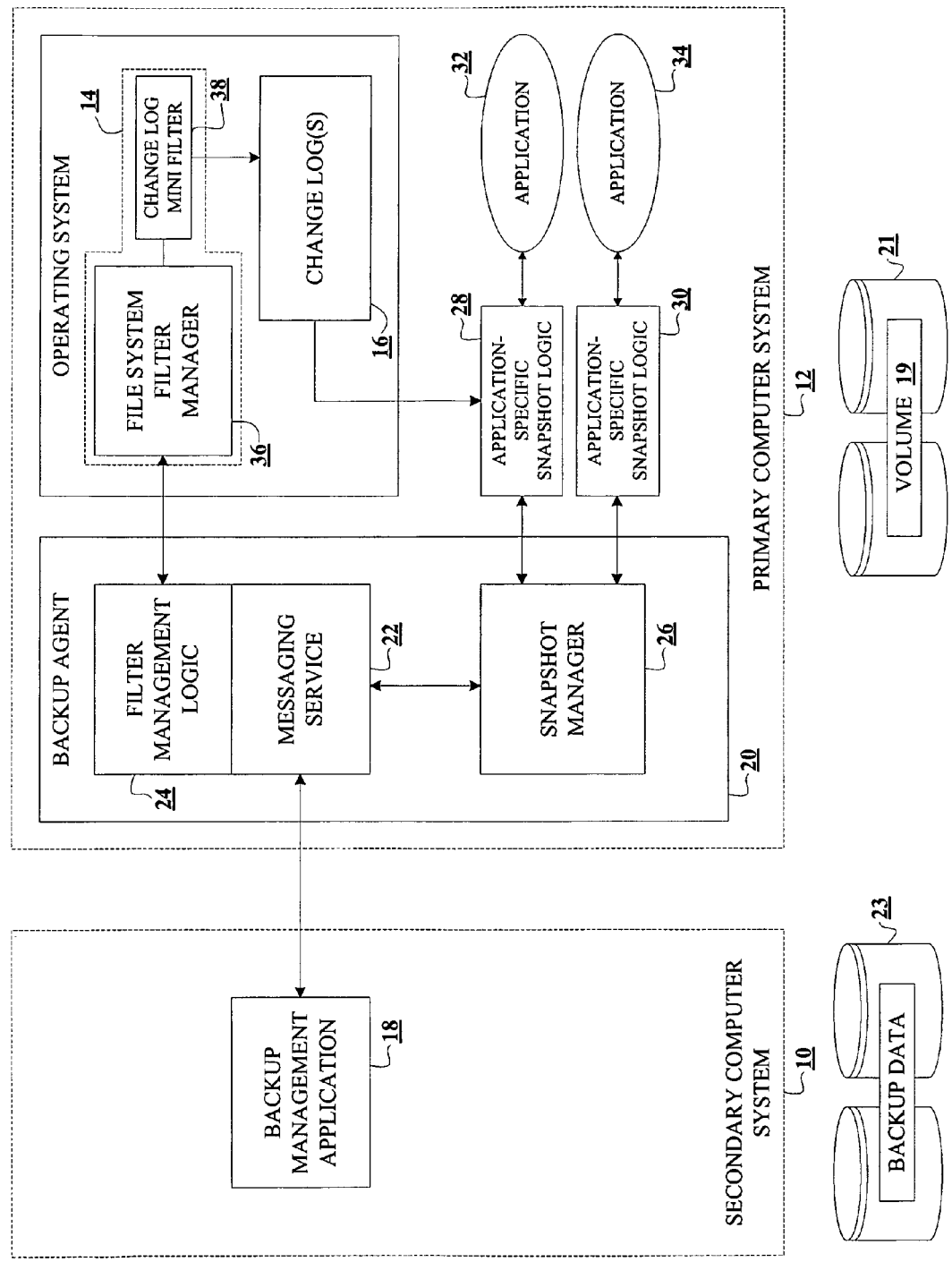
FIG. 1 illustrates an example of a secondary computer system coupled to a primary computer system configured with a file system filter driver for generating a change log, according to an embodiment of the invention.

A method and apparatus for efficiently identifying and logging block-level changes to a file system are disclosed. Consistent with one embodiment of the invention, a method involves monitoring in real time I/O requests directed to a file system and identifying those I/O requests that result in a change being made to one or more data blocks of a particular directory or file that a user has selected to be periodically backed up as part of a block-level incremental backup. Upon detecting such an I/O request, information about the changed data block or blocks (referred to herein as block change information) is written to a log file. In contrast to a conventional sequential log file, a log file consistent with an embodiment of the invention is organized or structured such that the information about the block changes are ordered and grouped by the particular directory or file to which the changes relate. For example, in one particular embodiment of the invention, the log file is structured as a b-tree, and each nodal element of the b-tree corresponds with a particular directory or file of a specific volume for which a block-level change has occurred. Accordingly, all block change information for a given directory or file appears in one data record (e.g., an ordered element of a b-tree node). Consequently, during a block-level incremental backup operation, a backup agent can efficiently identify and locate the block-level changes associated with a particular directory or file by searching the b-tree for the nodal element associated with the directory or file, and then reading the block change information for that directory or file.

In general, this method of logging block-level file system changes is advantageous over conventional methods for a number of reasons. In contrast to conventional methods, where file system changes are identified only after a backup operation has been requested, consistent with a method described herein, file system changes are logged and organized to make them quickly accessible at the time a backup operation is initiated. Locating the block changes for a particular subset of directories or files is achieved easily by searching for nodal elements associated with those directories or files. Furthermore, the use of a b-tree structured log file eliminates issues associated with duplicate log entries, which often arise when using a sequential log file.

Consistent with an embodiment of the invention, the user-selected set of directories and/or files to be monitored may be modified in real time without interruption to the monitoring and logging process. To decrease the amount of disk access required for logging activities, portions of a log file may be stored in memory. To further decrease the impact on the performance of the computer system, block change information for several I/O requests may be buffered and processed in a batch. In addition, in one embodiment of the invention, the logging process is integrated with a snapshot manager so as to synchronize logging events and snapshot events. For example, the logging process may utilize multiple log files, where each log file corresponds with a particular snapshot. Accordingly, block change information written to a first log file are to be included in a first snapshot, where as block change information written to a second log file are to be included in a second snapshot.

Reference will now be made in detail to an implementation consistent with the present invention as illustrated in the accompanying drawings. Wherever possible, the same reference numbers will be used throughout the drawings and the following description to refer to the same or like parts. Although discussed with reference to these illustrations, the present invention is not limited to the implementations illustrated therein. Hence, these illustrations should be regarded merely as examples of embodiments of the present invention, the full scope of which is measured only in terms of the claims following this description.

Those skilled in the art will recognize that much of the terminology used to describe aspects of the present invention is consistent with software and architecture models specific to Windows® operating systems. Indeed, in various embodiments, the invention may be consistent with, and implemented to work with, a version of the Windows® operating system. However, the general principles of the invention as described herein may be implemented to work with a wide variety of alternative operating systems and/or file systems, including those yet to be developed.

FIG. 1 illustrates an example of a secondary computer system 10 coupled to a primary computer system 12 configured with a file system filter driver 14 for generating a change log 16, according to an embodiment of the invention. A file system filter driver is an optional kernel-mode component that adds value to or modifies the behavior of a file system by filtering I/O operations for one or more file systems or file system volumes. For example, a file system filter driver may log, observe, modify, or even prevent the processing of certain I/O operations. Consistent with an embodiment of the invention, the file system filter driver 14 is utilized to analyze and log certain I/O operations for the purpose of identifying changes, at the block-level, to a file system to be backed up on a secondary computer system 10.

As illustrated in FIG. 1, the secondary computer system 10 is executing a backup management application 18 for configuring and administering backup operations. For example, utilizing the backup management application 18, an administrator may indicate one or more directories or a particular selection of files on one or more volumes (e.g., volume 19) of the primary computer system 12 that are to be periodically backed up—that is, copied from a storage device 21 on the primary computer system 12 to a storage device 23 on the secondary computer system 10. In addition to indicating the particular files to be backed up, an administrator may configure other backup settings, such as the frequency and scheduling of backup operations.

In general, the backup agent 20 on the primary system 12 performs the necessary actions to coordinate the backup operations and copy data from the primary system 12 to the secondary system 10. For instance, after an administrator has indicated the directories and files to be backed up, the backup management application 18 communicates a message indicating the selection to a messaging service 22 of the backup agent 20 executing on the primary computer system 12. In turn, the messaging service 22 relays the information to a filter management logic 24, which serves as an interface between the backup agent 20 and the file system filter driver 14. Accordingly, the filter management logic 24 communicates to the file system filter driver 14 the particular directories and files that are subject to a backup operation and therefore are to be monitored for changes. In one embodiment, the file system filter driver 14 may receive updated directory and file selections on a real-time basis, and in turn, modify its monitoring behavior without needing to be shut down and/or restarted.

According to an embodiment of the invention, a block-level incremental backup scheme is utilized. In a block-level incremental backup scheme, an initial baseline backup of the selected files is processed, followed by periodic backups of only those blocks of the selected files that have changed since the baseline backup operation was completed. Accordingly, the file system filter driver 14 monitors I/O operations to identify in real time any changes in the blocks of the files selected to be backed up (after the baseline backup). As I/O requests are processed and block changes occur, the file system filter driver 14 generates block change information indicating the exact blocks of the selected files that have changed. The block change information may include, for example: the volume ID and file index associated with the file that has changed; a starting block, indicating the block position of the first block in the file that has changed; a number indicating the total number of blocks—beginning at the starting block—that have changed; and a block change time, indicating the time at which the I/O request was processed and the blocks changed.

In an alternative embodiment of the invention, block change information may be specified in the form of a bitmap. For instance, each individual bit in a bitmap may represent a data block associated with a directory or file. Accordingly, an individual bit when set or cleared may indicate whether its corresponding data block in a file has changed or not. For example, when the fifth bit in the bitmap has been set, this may indicate that the fifth data block of the data blocks forming a particular file has changed, and should therefore be included in the next incremental backup operation.

As part of the block-level incremental backup scheme, the file system filter driver 14 intercepts I/O requests and monitors the I/O requests to detect changes to certain files. For instance, after the file system filter driver 14 has detected a successfully processed I/O request that results in a change to a file that is being monitored, the file system filter driver 14 may flush the block change information to the change log file 16. Alternatively, block change information from several I/O requests may be temporarily buffered or queued in a memory location dedicated for use by the file system filter driver 14 until a predetermined number of I/O requests have been processed. When the predetermined number of I/O requests have been processed, the file system filter driver 14 may perform batch processing of the queue or buffer by flushing all of the block change information to the change log file 16 in a batch. Furthermore, as described in greater detail below, various portions of the change log 16 may be stored in memory such that a flushing operation by the file system filter driver 14 does not result in a disk access. In any case, once the block change information has been flushed to the change log 16, the backup agent 20 (or an application-specific snapshot logic) may utilize the change log 16 in a block-level incremental backup scheme to identify the particular data blocks of any files that have changed between backup operations.

As illustrated in FIG. 1, the backup agent 20 includes a snapshot manager component 26. The snapshot manager 26 orchestrates the process of collecting the necessary data in order to generate a file system or application-specific snapshot to be stored at the secondary computer system 10. Snapshots are persistent, point-in-time copies of data, and are widely used in incremental block-level backup schemes. Although the invention is generally independent of any specific type or structural format of a snapshot, in one embodiment, application data are backed up using snapshots generated by (and otherwise consistent with) the Volume Shadow Service or Copy Service executing on Windows® operating systems from Microsoft® Corporation.

In one embodiment of the invention, the snapshot manager 26 may communicate with one or more application plug-ins (e.g., application-specific snapshot logics 28 and 30), which are tightly integrated with the applications 32 and 34 that generate the data to be backed up in application-specific snapshots. For example, upon receiving a request to generate an application-specific snapshot from the backup management application 18 via the messaging service 22 of the backup agent 20, the snapshot manager 26 may communicate one or more instructions or commands to application-specific snapshot logic 28 or 30. Each application-specific snapshot logic 28 or 30 manages the process of identifying the required application data to be included in an application-specific snapshot for the application to which the application-specific snapshot logic is associated. Accordingly, an application-specific snapshot logic may read block change information from the change log 16 in order to identify the particular blocks of data to be included in an application-specific snapshot. Furthermore, an application-specific snapshot logic may be designed to deal with potential data corruption issues that may arise as an application continues to generate data while the backup data are being identified for the purpose of inclusion in an application specific snapshot. Although FIG. 1 is shown to include only two applications 32 and 34 and associated application-specific snapshot logics 28 and 30, in various embodiments any number of applications and associated plug-ins may be utilized. Furthermore, the file system filter driver 14 is independent of any particular type of application, and in general, may be used to track file system changes made by any number and type of applications. An application-specific snapshot logic may be implemented to work with applications, including (but not limited to): Microsoft® Exchange and SQL Servers, and Oracle® database systems. Furthermore, the snapshot manager 26 may read block change information directly from the change log 16 to gather data to be included in a file system snapshot (e.g., a non-application-specific snapshot).

As illustrated in FIG. 1, the file system filter driver 14 is shown to include two individual components—a file system filter manager 36 and a change log mini-filter 38. Those familiar with file system filter drivers will appreciate that a file system filter driver 14 may be implemented as a mini-filter 38 integrated with a file system filter manager 36. In this case, the file system filter manager 36 is a type of generic file system filter driver that provides a framework for developing various file system filter drivers (e.g., implemented as mini-filters) to perform specific tasks. As described below in connection with the description of FIG. 2, in an alternative embodiment of the invention the file system filter driver 14 may be implemented as a stand-alone, or legacy, file system filter driver.

Figure 2:
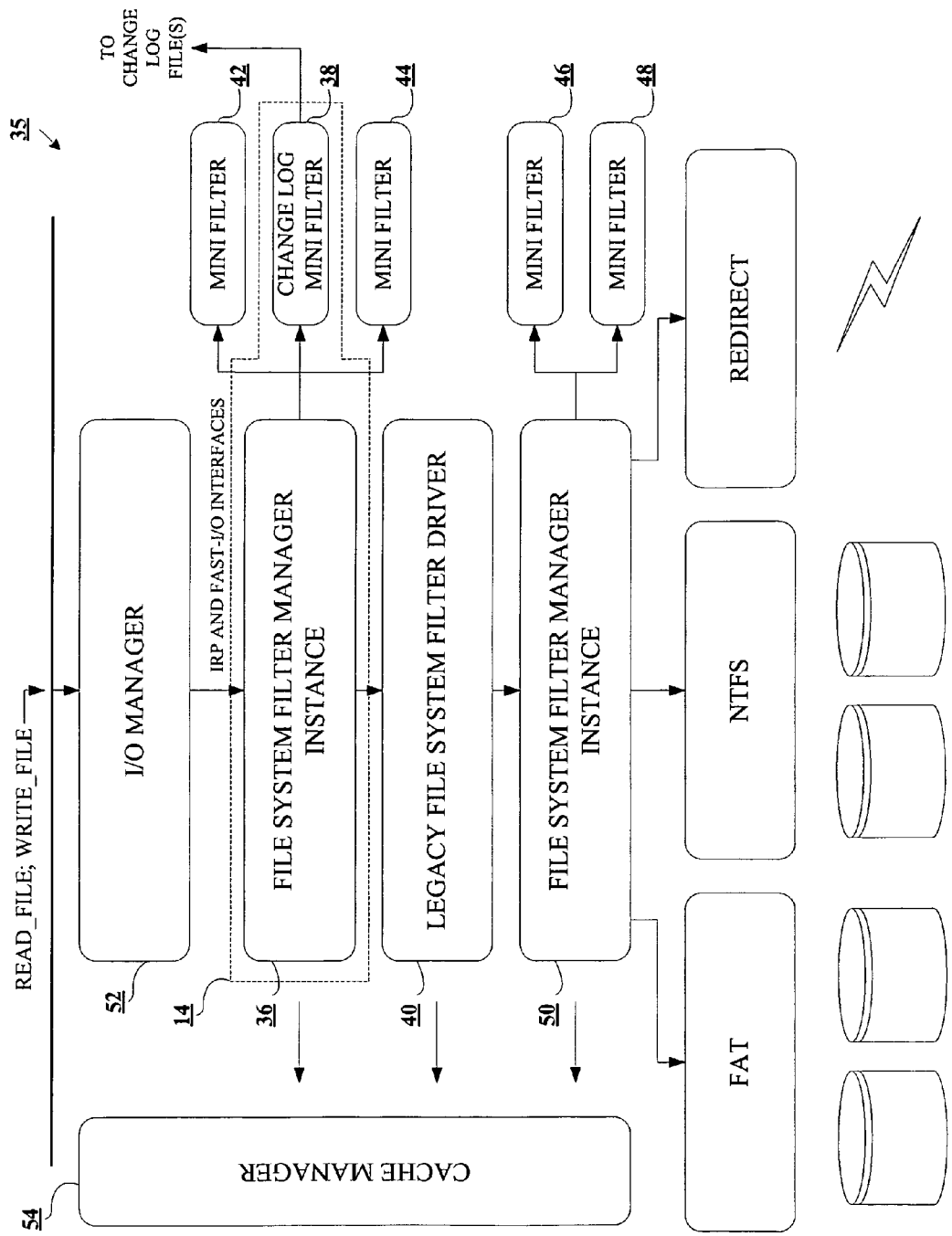
FIG. 2 illustrates an example of an input/output (I/O) subsystem of a computer system with a file system filter manager configured to operate with a change log mini-filter, according to an embodiment of the invention.

Turning now to FIG. 2, an example of an input/output (I/O) subsystem 35 of a computer system with a file system filter driver 14 is shown. As illustrated in FIGS. 1 and 2, the file system filter driver 14 is implemented as two, tightly integrated, but separate components—a file system filter manager 36 and a change log mini-filter 38. In an alternative embodiment of the invention, the file system filter driver 14 may be implemented as a stand-alone component, such as the legacy file system filter driver 40 illustrated in FIG. 2. As shown in FIG. 2, the file system filter driver 14 is implemented as a mini-filter (e.g., change log mini-filter 38) that operates in conjunction with a file system filter manager 36. The file system filter manager 36 is essentially a special file system filter driver that is designed to operate with customized mini-filters. Accordingly, programmers can quickly and easily develop mini-filters to provide the functionality of an independent file system filter driver without the hassle and complexity of designing and coding an entire file system filter driver from scratch. As illustrated in FIG. 2, mini-filters 38 (i.e., the change log mini filter), 42 and 44 are configured to operate in conjunction with a first instance of a file system filter manager 36, while mini-filters 46 and 48 are configured to operate in conjunction with a second instance of a file system filter manager 50. Whereas the change log mini-filter 38 serves as a mechanism for processing I/O operations for the purpose of identifying and logging changes to a file system, the other mini filters 42, 44, 46 and 48 may provide some other specialized I/O processing function.

According to an embodiment of the invention, the change log mini-filter 38 has a user or application interface mechanism (not shown) for receiving configuration instructions from a software application, such as the back-up agent 20. For example, a back-up agent 20 may provide the change log mini-filter 38 with data selection criteria, such as a user-generated list of directories or files that are to be monitored for changes. If a user wants to add or remove a directory or file from the list, any changes to the list may be communicated to the change log mini-filter 38 via the backup agent without interrupting the logging process and requiring the file system filter driver 14 to be restarted. Accordingly, the file system filter driver 14 can adapt and change its monitoring and logging behavior in real time as user-provided instructions are received.

When the change log mini-filter 38 is first initiated, it registers with the file system filter manager 36 to receive notifications when certain I/O operations are received and processed. For example, the change log mini-filter 38 may request that it be notified when any write or modify I/O operation is received, and when certain write or modify I/O operations are successfully processed. Accordingly, the filter manager 36 intercepts those I/O requests received from the I/O manager 52 for which the change log mini-filter has registered. The change log mini-filter 38 analyzes the intercepted I/O operations to determine whether they are directed to a volume and file that is to be monitored for changes. When an I/O operation is directed to a volume and file being monitored for changes, the change log mini-filter registers to receive notification when the I/O request has been successfully processed. This is sometimes referred to as registering a callback—that is, the mini-filter requests that the file system filter manager call (or notify) the mini-filter when some specified activity occurs. When the file system filter manager 36 notifies the change log mini-filter 38 that the I/O operation has successfully been processed, the change log mini-filter 38 queues the block change information for the I/O request, so that it can later be flushed to the appropriate change log file.

In one embodiment of the invention, the file name for a file is queried only when an I/O request is made to initially open the file. For example, when the file system filter manager 36 intercepts an I/O request for opening a file that is being monitored for changes, the file name and other associated information (e.g., file handle) will be cached in a stream context within the cache manager 54. Accordingly, subsequent I/O requests to write and/or modify the same file will not require an additional file name lookup operation. Instead, the cached filename can be utilized.

Furthermore, in one embodiment of the invention, when the file system filter driver 14 queues the block change information associated with a file system change to be flushed to the change log 16, the file system filter driver 14 may check the size of the queue. If the size of the queue meets or exceeds a predetermined threshold, the file system filter driver 14 will flush the entire contents of the queue to the change log 16 in a batch, thereby improving processing efficiency.

In one embodiment of the invention, the file system filter driver 14 is configured to receive information about snapshot activities so that logging and backup activities can be synchronized. For example, referring again to FIG. 1, the backup agent 20 may receive a request for snapshot data from the backup management application 18 executing on the secondary computer system 10. When the backup agent 20 receives the snapshot request, the snapshot request may be forwarded to an application-specific snapshot logic 28 for processing. In addition, the backup agent 20 may communicate a message to the file system filter driver 14 notifying the driver of the snapshot request. When the snapshot request has successfully been processed, the backup agent 20 may notify the file system filter driver 14 that the snapshot request has been processed. Accordingly, the file system filter driver 14 can adapt its logging behavior to ensure that file system changes are reflected in change logs that correspond with the timing of snapshots. By integrating backup procedures such as snapshot requests into the logging activity, the file system filter driver 14 need not detect the exact time a snapshot request is received and need not classify each I/O request as being pre- or post-snapshot with respect to a particular snapshot request.

Figure 3:
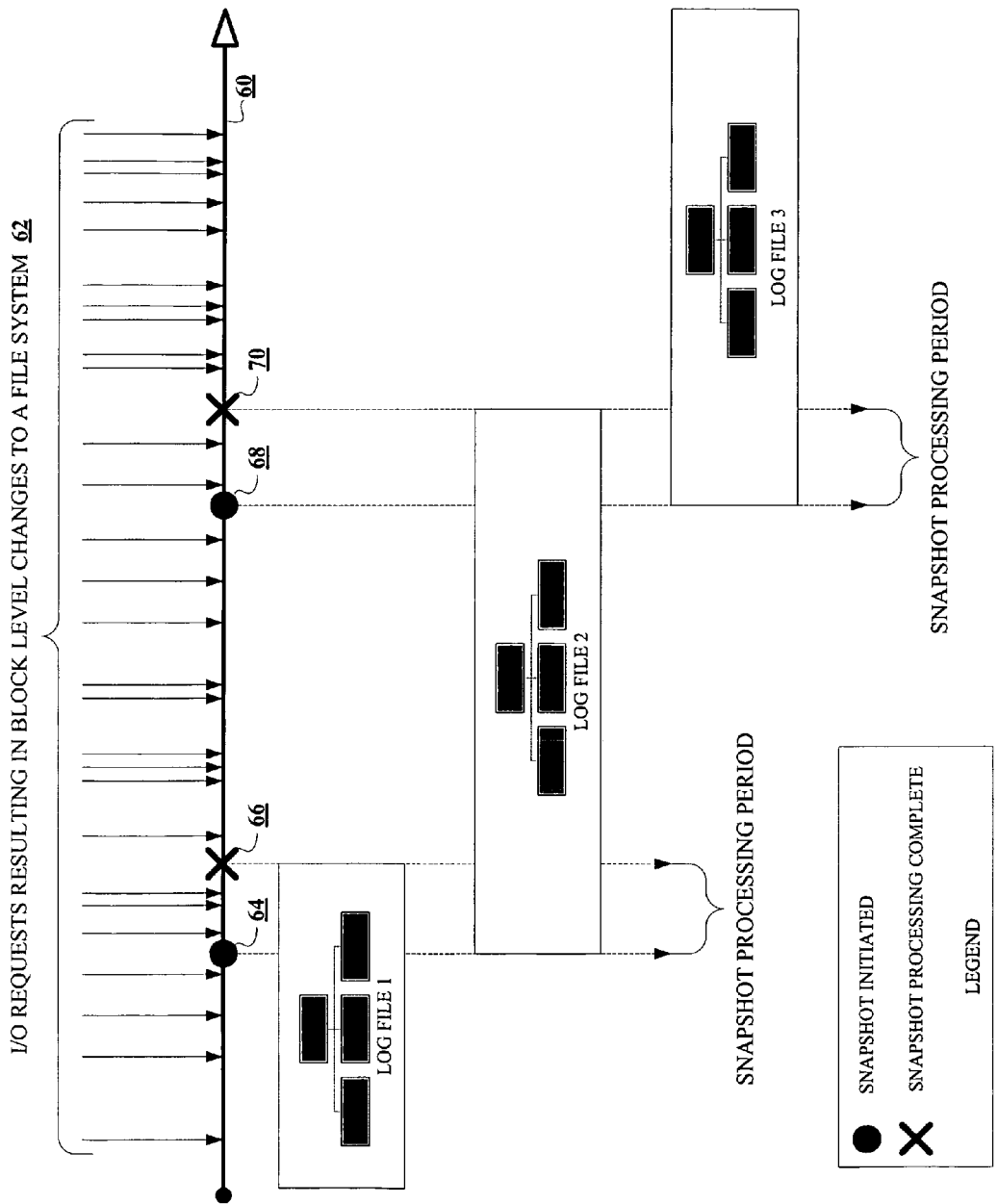
FIG. 3 illustrates how multiple log files may be generated in concert with snapshot-related events, according to an embodiment of the invention.

By way of example, in one embodiment of the invention, snapshot and logging activities are synchronized as illustrated in FIG. 3, which shows how multiple log files may be generated in concert with snapshot-related events. As illustrated in FIG. 3, the horizontal line with reference number 60 represents the state of a file system over time. The vertical arrows 62 directed to the horizontal line 60 represent I/O requests that result in block-level changes to files in a file system that is being monitored for changes by the file system filter driver 14. Going from left to right along the horizontal line 60, it can be seen that I/O requests resulting in block-level changes to monitored files are being logged to log file 1. Then, at the point in time represented by the circle with reference number 64, a snapshot request is received and a snapshot operation is initiated. Given that a snapshot represents the state of the file system at a particular point in time, all of the file system changes resulting from I/O requests processed prior to the snapshot request are to be included in the snapshot, and all file system changes resulting from I/O requests occurring subsequent to the snapshot request are to be excluded from the snapshot. Accordingly, when the snapshot request is initially received, the file system filter driver 14 is notified and a new change log (e.g., change log 2) is generated. During the period of time when the snapshot data are being processed (e.g., identified and gathered), the file system filter driver 14 logs changes to both log file 1 and log file 2. For example, during the time represented on the horizontal line 60 between the circle with reference number 64 and the "X" with reference number 66, file system changes are logged to both log file 1 and log file 2. As shown in FIG. 3, this process is repeated as another snapshot is initiated (e.g., at circle 68 on horizontal line 60) and processed. Accordingly, file system changes are logged to log file 2 and log file 3 during the snapshot processing period represented in FIG. 3 as the portion of horizontal line 60 between circle 68 and "X" 70.

Synchronizing logging and snapshot events in this manner results in temporarily logging file system changes to two change log files. This may require additional overhead (e.g., processing resources), but it eliminates the requirement of having the file system filter driver 14 be dependent upon the exact timing of snapshot creation (e.g., the exact timing of when the snapshot request is received). Of course, in an alternative embodiment of the invention, the synchronization of change log file creation may coincide with the snapshot creation event, such that the file system filter driver logs all file system changes associated with a first snapshot in a first log file, and all changes associated with a second snapshot in a second log file, and so forth.

Figure 4:
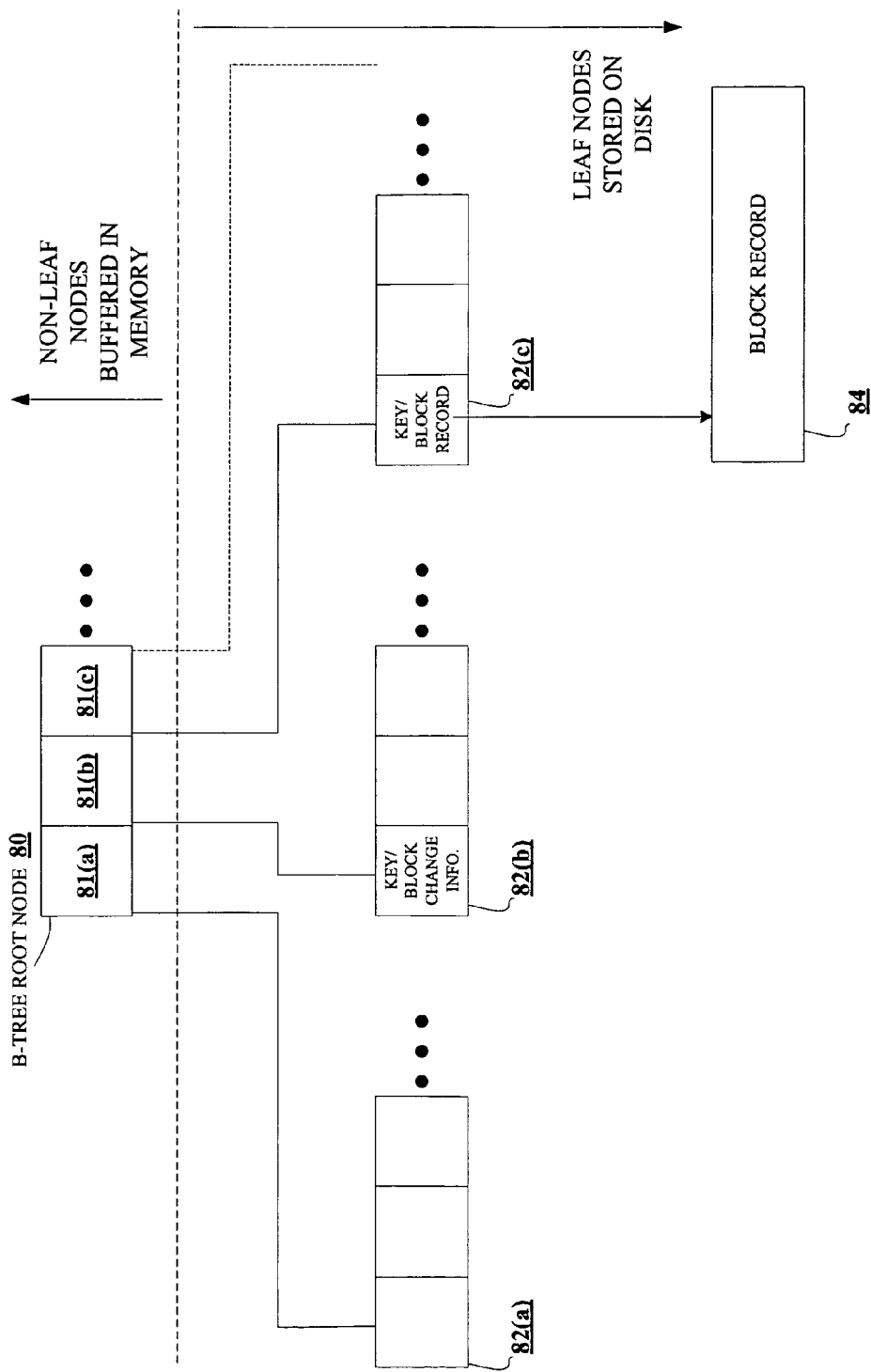
FIG. 4 illustrates an example of a log file structured as a b-tree, according to an embodiment of the invention.

Consistent with an embodiment of the invention, the log file is structured such that block change information are logged non-sequentially and grouped or ordered based on the directory or file to which the changes relate. For instance, in one embodiment of the invention, the log file 16 is structured as a b-tree. A b-tree is a tree data structure that keeps data sorted and allows searches, insertions, and deletions in logarithmic amortized time. FIG. 4 illustrates an example of a log file structured as a b-tree, according to an embodiment of the invention. As illustrated in FIG. 4, the b-tree has a root node 80 and several child nodes 82(*a-c*). Each node of the b-tree has several nodal elements (e.g., 81*a*, 81*b* and 81*c*) and each nodal element has a unique key, which corresponds with an individual directory and/or file. As file system changes are detected and block change information items are added to the b-tree structured change log, the size of individual nodes (e.g., the number of nodal elements), as well as the total number of nodes, increases as with a conventional b-tree. Although the particular structure of the b-tree may vary depending upon the implementation, in one embodiment of the invention the b-tree is of the order forty-six. This implies the number of nodal elements (and therefore keys) is ninety-one and the maximum number of children per parent node is ninety-two. This is consistent with limiting the size of each node to four kilobytes. With a maximum depth of four, the b-tree can accommodate a maximum of 778,000 nodes. In the event that a b-tree change log file reaches the maximum number of nodes, the file system filter driver 14 will open a new change log file.

In one embodiment of the invention, the b-tree key is a combination of the volume identifier and file index. Together, the volume identifier and file index uniquely identify each directory or file of the file system. Accordingly, when block change information for a particular directory or file is inserted into the change log, it is inserted (and therefore ordered) according to its volume identifier and file index. In contrast to a sequential log file, where log file entries are ordered based on the order in which the changes occur, the b-tree implementation groups all changes to a particular directory or file by b-tree key. This simplifies the processing of the log file as all block change information for a particular directory or file are associated with a single key, and generally stored in the same location. Furthermore, using a b-tree reduces the processing expense related to processing duplicate log file entries. For instance, in a sequential log file, the same block(s) of a file may change several times between backup operations, where ultimately, only the last change made to the block before the backup operation is relevant. However, each time the file is modified, a change is logged to the sequential log file in the order the I/O requests are processed. Accordingly, log entries for several I/O requests that result in changes to a file may be interspersed within a long list of log entries for several files. With a sequential log, only after processing the entire log will it be apparent which changes are relevant for purposes of a backup operation. Utilizing a b-tree structured log file eliminates duplicate log entries associated with the same block or blocks, and therefore improves the efficiency of processing the change log file. For example, using a b-tree, a subsequent insertion of block change information for the same block of a file may result in the new block change information overwriting the old block change information. Alternatively, the new block change information may be written in addition to the old block change information. In any case, determining the exact changes that occurred to a particular file is achieved by simply analyzing the block change information that is stored grouped together under the same b-tree key. It is not necessary to process an entire sequential log file to determine the changes made to an individual directory or file.

In one embodiment of the invention, each nodal element will have associated with it enough memory to store a key and only one block change information item. If a particular file has been modified multiple times between backup operations such that multiple blocks of the same file have changed, a block record 84 will be allocated for the file, and the address of the block record will be associated and stored with the key in a nodal element of a b-tree node. Generally, the block record will include enough memory to store multiple block change information items. In an alternative embodiment of the invention, each b-tree nodal element will have associated with it enough memory to store multiple (e.g., ten) block change information items.

In one embodiment of the invention, the b-tree nodes are not buffered in place, but instead, are stored on disk. For example, each node stored on disk will be read from disk only when required, and then written back to disk when changed. However, in an alternative embodiment of the invention, only the leaf nodes of the b-tree may be buffered, while any non-leaf nodes are stored on disk. Only when a b-tree insertion operation results in a restructuring of the b-tree due to rebalancing of the nodes are the leaf nodes written to disk.

Figure 5:
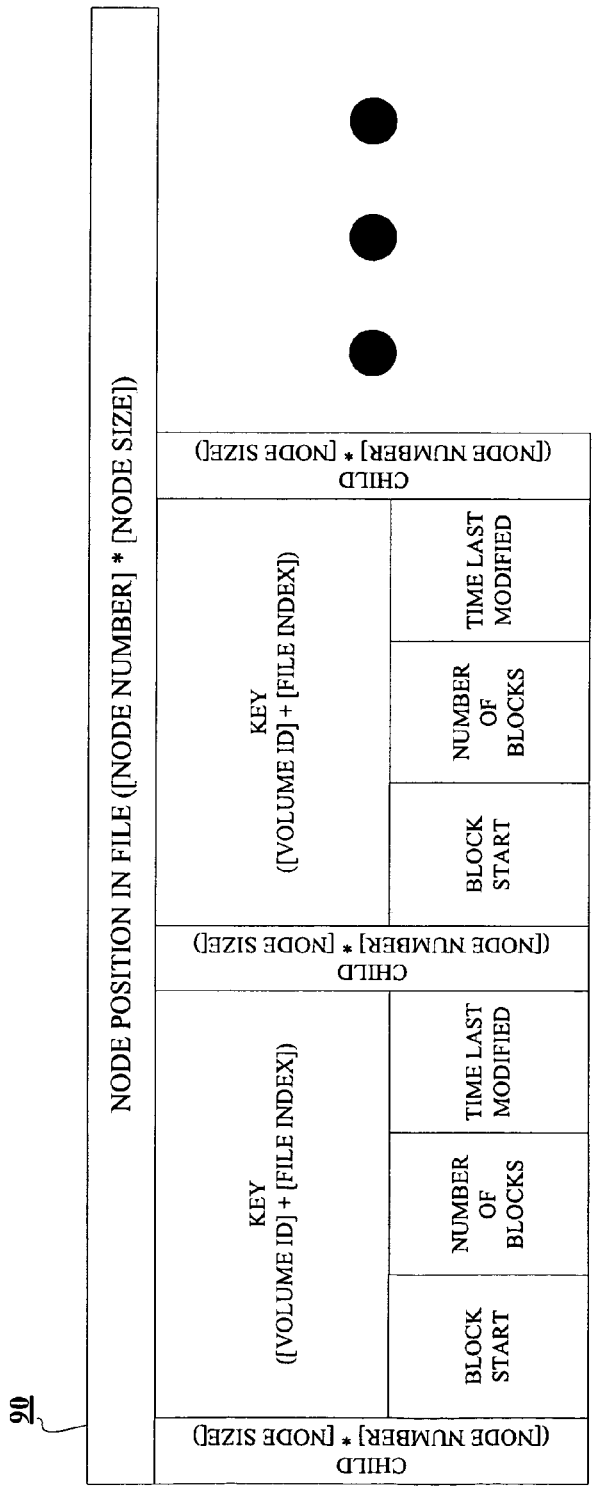
FIG. 5 illustrates an example of a b-tree node, according to an embodiment of the invention.

Referring now to FIG. 5, an example of a b-tree node is shown. The actual size and structure of the b-tree may vary depending upon the particular implementation. However, in one embodiment of the invention, each node of the b-tree is a fixed size of four kilobytes. In addition, each node is assigned a number 90 to indicate its position relative to other nodes in the b-tree file. For example, a node having node number seventeen will be stored within the file at an offset position equivalent to seventeen times the four kilobyte size of each node. More generally, a node identified by a number N is positioned within the file at an offset equal to N times the size of each node, or, (N*sizeof(node)). This node number is stored within a node's parent.

Figure 6:
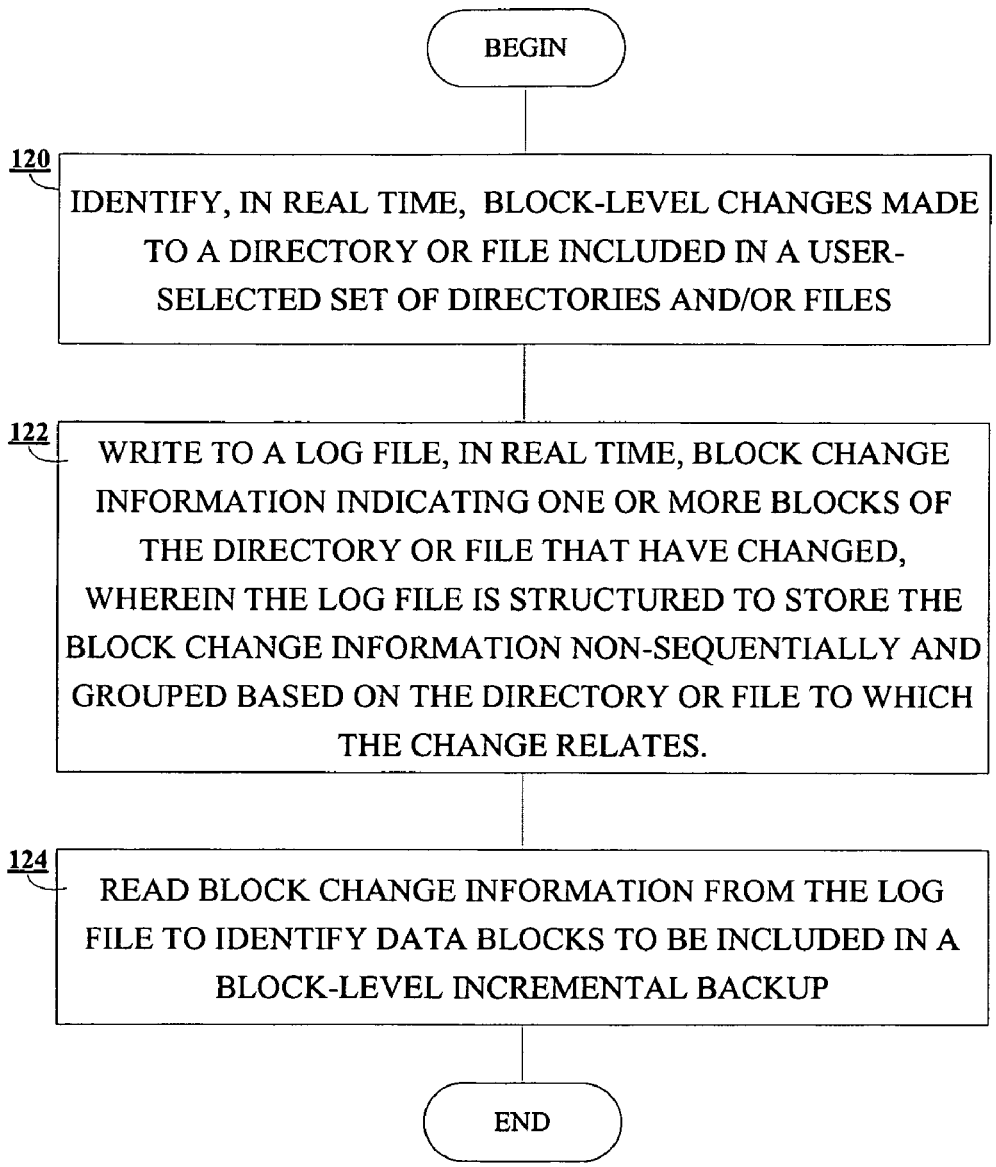
FIG. 6 illustrates a method, according to an embodiment of the invention, for efficiently logging file system changes.

FIG. 6 illustrates a method, according to an embodiment of the invention, for efficiently logging file system changes. As illustrated in FIG. 6, the method begins at operation 120 when a file system filter driver is initiated to identify in real time block-level changes made to directories or files included in a user-selected set of directories and files. As described in greater detail above, the data selection criteria that specifies the particular directories and files to be monitored for changes may be received in real time such that the file system filter driver can adapt to changes in the files and directories to be monitored without interrupting monitoring and logging operations.

At method operation 122, block change information is written to a log file structured such that the block change information is ordered and grouped based on the directory or file to which the change relates. For instance, all block change information pertaining to changed blocks of a particular file are grouped to be included in one location based on that file. Furthermore, the directories and/or files are ordered based on their volume identifier and file index. Consequently, at method operation 124, reading the block change information for a particular file is highly efficient as it is not necessary to read all block change information in a sequential order, but instead, only the block change information grouped together for a particular file.

Figure 7:
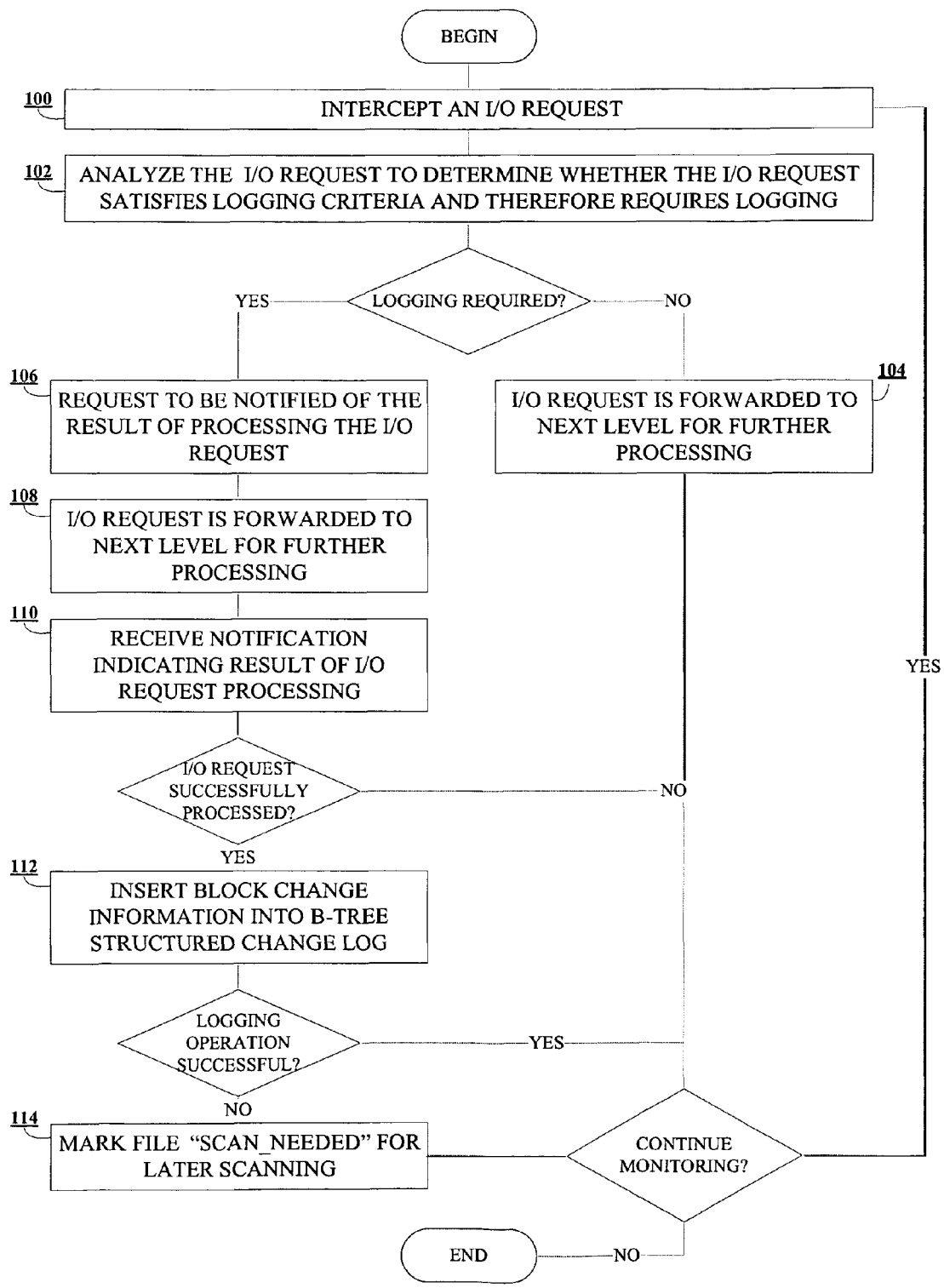
FIG. 7 illustrates a detailed method for generating a log file, according to a particular embodiment of the invention.

FIG. 7 illustrates a more detailed method for generating a change log file, according to an embodiment of the invention. In particular, the method illustrated in FIG. 7 is achieved with a mini-filter as illustrated in FIG. 1, and utilizes a b-tree structured log file. As illustrated in FIG. 7, the method begins at operation 100 when the file system filter driver 14 receives or intercepts an I/O request directed to a file system of the primary computer. In general, the change log mini-filter 38 will have registered with the file system filter manager 36 to be notified of certain I/O requests, such as any I/O request involving a write or modify operation to a file system. If the I/O request is a write or modify request, at operation 102 the I/O request is analyzed by the change log mini-filter 38 to determine whether the I/O request satisfies certain pre-established logging criteria. In particular, at operation 102, the file system filter driver 14 analyzes the I/O request to determine whether the I/O request is directed to a file of a volume that is included in a list of files to be monitored for changes. In addition, the file system filter driver 14 may determine whether the I/O request is directed to a file that is included in an exclusion list—a list of files that are not to be monitored for changes. For example, if a file is included in a list of files to be monitored, but is also included in the exclusion list, the file need not be monitored for changes. This may occur, for example, when a user has purposefully included a particular file in the exclusion list despite specifying the parent directory as a target. Alternatively, a file may be included in the exclusion list when a certain percentage of the total blocks comprising the file have changed, thereby making it more efficient to backup the entire file instead of the particular blocks of the file that have changed.

Referring again to FIG. 7, if the I/O request is not directed to a file included in the monitoring list, then at operation 104 the I/O request is forwarded to the file system driver for processing, and no further action is taken by the file system filter driver 14 with respect to the I/O request. However, if the file system filter driver 14 determines that the I/O request meets the logging criteria, at operation 106 the file system filter driver 14 registers to be notified when the I/O request has been processed. Next, at operation 108, the I/O request is forwarded to the file system driver for processing. At operation 110, the file system filter driver 14 receives notification of the result of processing the I/O request.

If for some reason the I/O request was not successfully processed, then the I/O request is not logged, and no further action is taken with respect to the particular I/O request. However, if the I/O request was successfully processed, at operation 112 the appropriate block change information for the I/O request is inserted into the b-tree structured change log file. Finally, after inserting the block change information into the change log file, the result of the logging operation is determined. If the logging operation was unsuccessful, at operation 114 the file is marked for scanning. This may include, for example, adding the file to a list of files that will require scanning to determine block-level changes. If however, the logging operation was successful, no further action is taken.

The foregoing description of various implementations of the invention has been presented for purposes of illustration and description. It is not exhaustive and does not limit the invention to the precise form or forms disclosed. Furthermore, it will be appreciated by those skilled in the art that the present invention may find practical application in a variety of alternative contexts that have not explicitly been addressed herein. In general, the scope of the invention is defined by the claims and their equivalents.

A computer system and method for efficiently identifying and logging file system changes are disclosed. According to an embodiment of the invention, a computer system includes a file system filter driver—a kernel mode component capable of intercepting and processing I/O operations directed to a file system of the computer. The file system filter driver is configured to intercept I/O requests, analyze the requests, and log all requests resulting in a block-level change to a file, directory or volume included in user-selected subset of files, directories and volumes that are being monitored for changes. For instance, as the I/O subsystem of the computer system processes the I/O requests, if an I/O request results in a change to a file included in the user-selected subset of files, directories and volumes, the resulting change is logged in a change log. The information logged includes information identifying and pertaining to the individual blocks of the file directory or volume that have changed as a result of processing the I/O request. The log file to which the changes are logged is structured as a b-tree, such that each logging operation is the equivalent of a b-tree insertion operation.

What is claimed is:

1. A computer-implemented method, comprising:
identifying, in real time and at a block level, a change made to a user-selected set of directories or files of a volume of a file system as a result of an I/O request having been processed;
writing to a log file, in real time, block change information indicating one or more blocks from a particular directory or file of a particular volume that have changed as a result of the I/O request having been processed, wherein the log file is structured to store the block change information non-sequentially and grouped by the particular directory or file to which the change relates;
reading block change information from the log file to identify blocks of data to be included in a block-level incremental backup;
responsive to a snapshot event, generating a new log file; and subsequent to the snapshot event, writing to the new log file, in real time, block change information indicating one or more blocks from the particular directory or file of the particular volume that have changed as a result of an I/O request having been processed after the snapshot event.

2. The computer-implemented method of claim 1, further comprising:

receiving, in real time, data selection criteria indicating a user-selected set of directories or files to be monitored for changes, and adapting to monitor the user-selected set of directories or files without interrupting logging operations.

3. The computer-implemented method of claim 1, wherein the steps of identifying the change and writing the block change information to the log file are performed by a file system filter driver configured to register with a file system process to receive a notification when an I/O request results in a change to the user-selected set of directories or files of the volume of the file system.

4. The computer-implemented method of claim 3, wherein the file system filter driver is configured as a mini-filter integrated to operate with a file system filter manager.

5. The computer-implemented method of claim 3, wherein the log file is structured as a b-tree, and each nodal element of the b-tree corresponds with the particular directory or file of a volume of the file system for which a block-level change has occurred.

6. The computer-implemented method of claim 3, wherein one or more portions of the log file are stored in memory, and said writing to the log file involves writing the block change information to a portion of the log file in memory.

7. A computer system, comprising:

an I/O subsystem configured to service client-initiated I/O requests by writing data blocks to, and reading data blocks from, a disk-based file system;

a file system filter driver configured to i) receive, in real time, data selection criteria specifying a user-selected set of directories or files of the disk-based file system to be monitored for changes, ii) identify when an I/O request has caused a change to one or more blocks included in a directory or file of the user-selected set of directories or files to be monitored, and iii) write block change information to a log file when an I/O request has caused a change to one or more blocks included in a directory or file of the user-selected set of directories or files to be monitored, wherein the log file is structured having the block change information grouped within the log file based on the directory or file to which the change relates;

a backup agent to prepare an incremental backup by identifying only blocks that have changed since a previous backup operation by reading block change information from the log file; and a snapshot manager configured to generate, in response to a snapshot event, a new log file and subsequent to the snapshot event, to write to the new log file, in real time, block change information indicating one or more blocks from a particular directory or file of a particular volume that have changed as a result of an I/O request having been processed after the snapshot event.

8. The computer system of claim 7, wherein the file system filter driver is configured to adapt, without interruption, to monitor for block-level changes made to files or directories specified in additional data selection criteria received after receiving initial data selection criteria.

9. The computer system of claim 7, further comprising:

a file system filter manager, wherein the file system filter driver is configured as a mini-filter integrated with the file system filter manager, and the mini-filter is configured to register with the file system filter manager to receive notification when an I/O request results in a change to a directory or file included in the user-selected set of directories or files of the file system to be monitored for changes.

10. The computer system of claim 7, wherein the log file is structured as a b-tree, and each nodal element of the b-tree corresponds with a particular directory or file of the user-selected set of directories or files for which a change has been identified.

11. The computer system of claim 7, wherein the file system filter driver is configured to store one or more portions of the log file in memory and to write block change information to the one or more portions of the log file in memory.

12. A computer-implemented method, comprising:

analyzing I/O requests directed to a file system to determine whether the I/O requests satisfy logging criteria;

writing block change information indicating blocks of a directory or file that have changed as a result of processing an I/O request to a log file structured as a b-tree when the logging criteria are satisfied, wherein nodal elements of the b-tree correspond with files or directories for which one or more blocks have changed, and when written to the b-tree the block change information is associated with a nodal element of the b-tree;

prior to writing the block change information to the log file structured as the b-tree, storing the block change information in a queue; and when the queue contains a predetermined number of block change information entries, writing all the block change information entries in the queue to the log file structured as the b-tree.

13. The computer-implemented method of claim 12, wherein writing the block change information to the log file structured as the b-tree includes writing the block change information to a log file that corresponds with a particular snapshot, wherein the block change information for a first snapshot operation is located in a first log file, and block change information for a second snapshot is located in a second log file.

14. The computer-implemented method of claim 12, wherein the block change information includes i) a volume ID and file index of the directory or file with blocks that have changed, ii) a starting block indicating a block position of a first block in the directory or file that has changed as a result of the I/O request, iii) a number indicating a number of blocks that have changed as a result of the I/O request, and iv) a time indicating the time at which the I/O request was processed and the blocks changed.

15. The computer-implemented method of claim 12, wherein the block change information is a first block change information and a second block change information from a second I/O request directed to the same file in the same volume as the first block change information is stored in a single block record, and an address of a block record is stored in a nodal element of the b-tree that corresponds with the directory or file to which the block information relates.

16. The computer-implemented method of claim 12, wherein the block change information includes block change information from multiple I/O requests directed to the same file in the same volume and the block change information is written to the same nodal element of the b-tree.

17. The computer-implemented method of claim 12, wherein non-leaf nodes of the b-tree are stored in memory and written to disk storage only when writing block change information to the log file results in a structural change to the b-tree.

* * * * *